March 31, 1970 T. R. ROHWEDER 3,503,819
PROCESS FOR APPLYING A MEMBRANE FACING TO A SURFACE
Filed Oct. 4, 1966
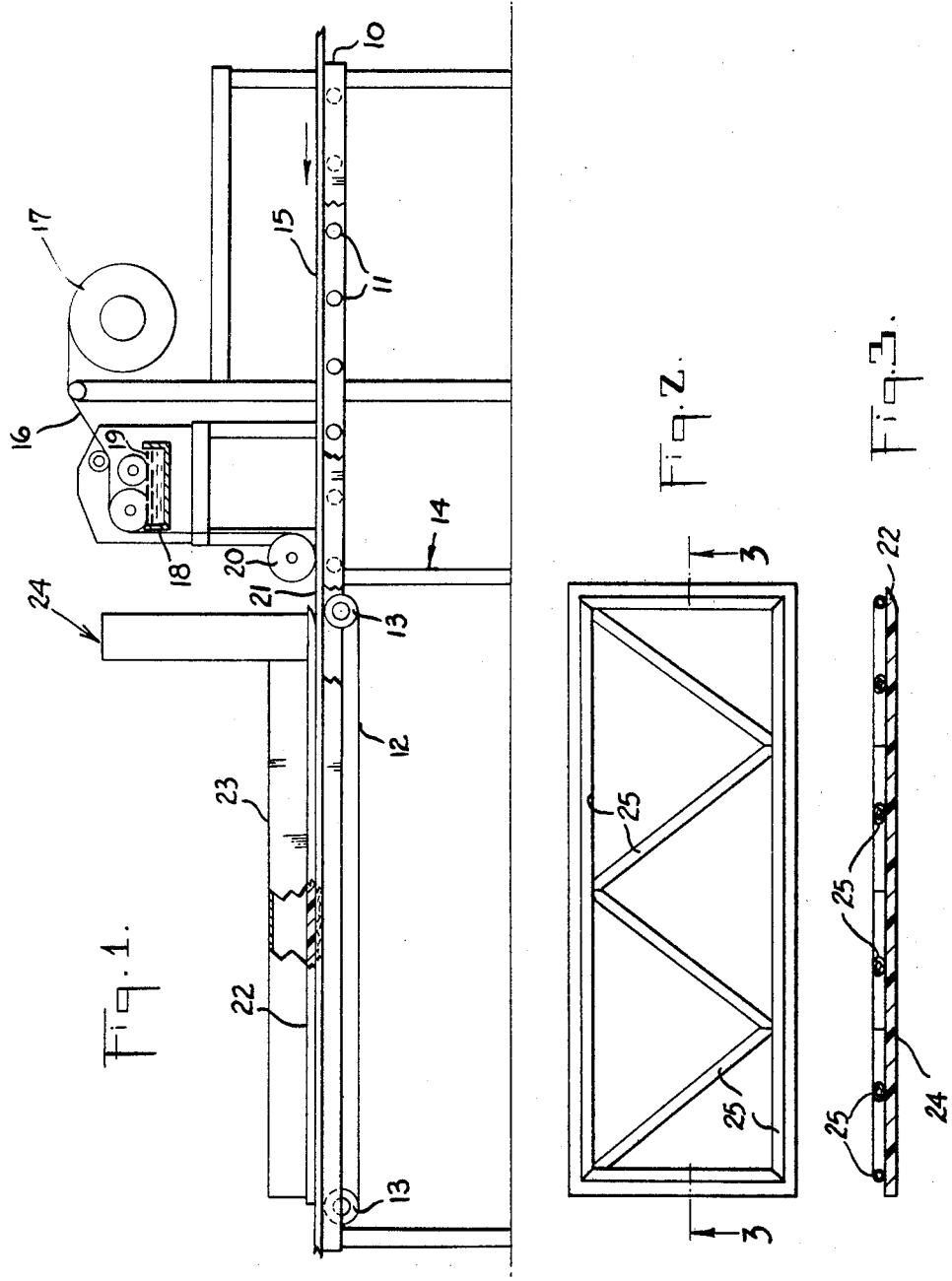
INVENTOR.
THEODORE ROHWEDER
BY
ATTORNEY

3,503,819
PROCESS FOR APPLYING A MEMBRANE FACING TO A SURFACE
Theodore Richard Rohweder, Toledo, Ohio, assignor to Johns-Manville Corporation, New York, N.Y., a corporation of New York
Filed Oct. 4, 1966, Ser. No. 584,212
Int. Cl. B32b *17/04*
U.S. Cl. 156—178                                                 10 Claims

ABSTRACT OF THE DISCLOSURE

The continuous adherence of highly pliable facing material, such as thin plastic film, to a discontinuous and open surface of very low density and resilient fibrous body substrates with the attainment of visually flat and uniform plane facing surfaces, comprising applying adhesive to the facing material and joining the facing material to the surface of such fibrous substrates and transversely moving the resulting assemblage of the facing material superimposed on the surface of the fibrous substrate, under heat and light pressure applied in a uniform plane until the adhesive is substantially set by a contact with a uniformly flat plane surface of a glass fiber reinforced resin platen.

---

This invention comprises a novel and improved method of applying a highly pliant facing material to low density, bonded fibrous bodies, and means therefor.

The achievement of a visually completely flat surface or uniform plane facing through a continuous production application of highly pliable surfacing materials to very low density, and in turn easily compressible masses composed primarily of randomly dispersed fibers wherein the structure of the mass is open and presents an open irregular surface, as is typified by low density glass or mineral wool, etc., boards or mats, has been found not to be practical, or even possible with typical application techniques or means. For instance, as a result of the discontinuous, open surface and irregularly dispersed fibers and non-uniform composition or density variations of low density fibrous bodies, among other factors, highly pliable, conformable materials such as normal textile cloths, thin plastic films, thin fibrous mats, sheets or other typical membrane-like materials, when superimposed and applied, particularly with an intermediate adhesive, assume and conform to the surface undulations and irregularities of such substrate bodies. And, with normal pressure contacting means for continuous application techniques such as rolls, brushes, wiping blades, and the like, entailing some compression, the pressure is applied unevenly and the pliable surface material is also adhered to the valleys or low areas and depression defects and thus assumes, retains and transmits these substrate surface conditions and irregularities and imperfections.

In given applications in which visual aesthetics are a significant factor such as ceiling panels or tiles wherein glass, mineral wool and the like fibers are commonly employed in very low density structures as the substrate or base article, the achievement of a completely flat surface constitutes a major problem because when placed in a ceiling or wall construction any waving, undulations, hills or valleys, dents, crevices or other slight irregularities or defects are readily detected by the eye either directly or indirectly by reflected light and are objectionable. And, since light sources are most frequently located about or adjacent to the ceiling, and light and its reflection frequently amplifies the visual effects or distortions resulting from otherwise relatively minor surface imperfections, the surface requirements for this class of products are stringent and critical.

Moreover, the most common and preferred adhesives employed in the manufacture of faced or covered fibrous bodies, such as ceiling panels, comprise thermally cured or activated compositions such as the extensively employed thermosetting or thermoplastic resins, or on the other hand adhesives dispersed in liquid carriers or solvents which necessitate the removal of the liquid wherein the application of moderately elevated temperatures, e.g., about 120° to 500° F., is required to set or activate these adhesives and/or efficiently eliminate the liquid carrier or solvent. These temperature conditions, although not under normal circumstances extreme, are under many conditions and prolonged periods of operation sufficient to somewhat warp and/or distort pressing or leveling devices out of plane to a degree whereby they produce unsatisfactory products with visually unsmooth and unsightly surface conditions.

It is a primary object of this invention to provide an improved method of continuously applying a pliable conforming facing material to low density, bonded fibrous masses wherein a substantially flat or plane facing surface is produced which is not visually discernibly irregular and appears smooth under all lighting conditions.

It is also an object of this invention to provide an improved manufacturing operation and method of more economically, facilely and perfectly producing cloth and resin film surfaced bonded fibrous masses presenting no visually perceptible flaws.

It is a further object of this invention to provide a method and means of facing a low density, resilient, but dimensionally stable, bonded fibrous mass having an open, discontinuous surface with a pliant membrane and effecting a uniformly plane faced surface therewith.

It is a still further object of this invention to provide means and an operation for continuously applying and adhering of a facing of pliable membrane-like material to a low density bonded fibrous mass hiving an open, irregular surface and achieving a uniformly plane facing surface which is economical, permits continuous high production rates, and is not adversely affected by warping, distortion or other defects induced by the high temperatures required to set or activate thermosetting or thermoplastic resins and the like common adhesive materials.

These and other objects and advantages of this invention will become more fully understood and apparent from the following detailed description of this invention, and the accompanying drawings wherein:

FIG. 1 is a schematic view of the overall combination and sequence of means and components constituting the apparatus of this invention.

FIG. 2 is a top view of the platen shown in combination in FIG. 1 and illustrating in detail the reinforced construction thereof provided on its backside; and FIG. 3 illustrates a side view of the platen of FIG. 2 along lines 3—3.

This invention is specifically directed to effective and economical means of applying a facing of a pliant membrane-type material to very low density, about 0.25 to 10 pounds per cubic foot, typically and preferably about 1 to 5 pounds per cubic foot, fibrous board or mat bonded with an adhesive set or cured at least to the degree of providing handleability and dimensional stability, and of substantial structural integrity but yet compressible and resilient; for example, a phenolic or the like thermosetting resin bonded glass fiber board of about 2 pounds per cubic foot which is amply self-supporting in 1 inch thick sections measuring 1 or 2 feet by 2, 3 or 4 feet or greater and thus constituting a highly open, easily compressible and resilient self-supporting structure of randomly dispersed fibers joined primarily at their intersections and presenting exposed surfaces having a multiplicity of openings or interstices between the highly dispersed fibers together with fiber irregularities, undulations, crevices, wrinkles, etc. Common and commercially available articles of this type comprise, in addition to bonded glass fibers, mineral wool, wood fibers, asbestos and the like fibrous materials which are amenable to bonding or uniting into low density and thus open, compressible and resilient, but dimensionally and structurally stable, masses with any of the common adhesives including resins, either thermoplastic or thermosetting, in proportions of about 3 to 35% by weight of resin or other adhesive, based upon the fibrous content, and which are typified by ceiling panels, tiles, wall panel sections or boards and the like light weight, non-supporting partition or finish products, or simply components thereof.

In the continuous operation of this invention a highly pliable membrane-like material such as a normal woven cloth, thin plastic film, thin fibrous mat, etc., which is not structural or self-supporting and exhibits little or no resistance to substantially complete conformability, is applied to such bonded fibrous masses of the foregoing characteristics and permanently adhered or fixed thereon through the agent of an interposed adhesive. The adhesive, although preferably and most conveniently applied directly to the surface of the pliant membrane subsequently contiguous with the bonded fibrous mass, can alternatively be applied to the surface of the fibrous body, although the openness thereof normally would result in the reception and loss of uneconomical amounts, or to the subsequently contacting surfaces of both components. Adhesive application to either or both surfaces can be effected by any adaptable conventional means, as for exmaple a roller, brush, spray, overflow, etc., applicator.

Following suitable adhesive application, the pliant membrane is brought into juxtaposition with and superimposed upon one or more of the open and discontinuous exposed surfaces of the bonded fibrous mass whereupon the resultant assemblage of the membrane, interposed adhesive and bonded fibrous mass is progressively subjected to a light leveling force within the range of about 0.02 to about 0.14 pound per square inch applied in a flat uniform plane conterminously over the surface of the superimposed membrane while generally continuously moving in a transverse relation to the means applying the leveling force and generally perpendicular to the direction of the force, with the duration of the uniformly applied leveling force being maintained until the membrane is firmly and securely positioned and adhered in place.

A thermally activated adhesive, e.g. thermosetting or thermoplastic resin, being commonly utilized in the practice of this invention, and being particularly preferred for many obvious reasons as indicated hereinbefore, temperature applications to set or activate a given adhesive material must be applied generally simultaneously with the application of the light uniformly applied leveling force, i.e. temperatures up to about 500° F. and typically of about 150° to about 400° F. for a period sufficient to effectively activate or cure the same.

At these otherwise apparently moderate temperature conditions required to effectively and economically cure or activate thermosetting or thermoplastic resins, or even effectively remove a liquid carrier or solvent from an adhesive, it has been found that under normal conditions of continuous operation in the described process that the thermally induced dimensional changes in common structural materials, assembled in adequate and practical dimensions and construction for an effective pressing and/or leveling device, produces such warpage and deformation as to distort a substantially perfectly flat surface or plane to the point of impairing its use because of the introduction of visually perceptive irregularities or imperfections in the products formed therewith, except for such pressing and/or leveling devices comprising platens constructed of glass fiber reinforced resins. Apt resinous materials for such platen devices comprise the higher temperature resistant thermosetting resins such as phenol formaldehyde, urea formaldehyde and melamine formaldehyde, the epoxies, silicones, polytetrafluoroethylene and comparable resinous materials and compositions possessing high heat distortion points. Preferred materials constitute an epoxy resin body reinforced with 50% by weight of the resin of glass fiber.

Referring to the drawings in detail and particularly to the schematic illustration of FIG. 1, the carrier means for the bonded fibrous mass and formed assemblage is generally designated as 10 and comprises conveyor rollers 11 and conveyor belt 12 carried on rolls 13 all supported on frame 14. A low density thermosetting resin bonded glass fiber board 15 is substantially continuously transported in the direction of the arrow on carrier means 10 through the complete operation. A pliable facing membrane comprising a vinyl resin film 16 is drawn from supply roll 17 over adhesive applicator roll and supply 18 and an apt coating of thermoplastic, water dispersed polyvinyl acetate facing adhesive 19 (Milligan's Facing Adhesive No. 6747) is deposited upon the contacting surface of the film to provide an intermediate bonding means. The adhesive coated film 16 is brought into juxtaposition and superimposed upon the resin bonded glass fiber board 15 as the board is continuously transported past the means of contact roll 20.

Following the application of the film surfacing membrane 16 to the board substrate 15 and the formation of a composite assembly 21 of the membrane-adhesive-board, the assembly 21 is thereafter transported by conveyor belt 12 on rolls 13 to provide level and conterminous support in transversely moving relation and contact with glass fiber reinforced resin platen 22 positioned within curing oven 23 provided with a supply of hot air at 24 or other appropriate heating means whereby the heat is transferred through platen 22 by conduction or other apt thermal transfer mechanisms to achieve a cure of the resin 19 and permanently unite the facing membrane while held in a perfectly flat uniform plane. The length of platen 22 and enclosing oven 23 and the temperature therein is coordinated with the carrier speed and rate of transporting the assemblage through the operation to provide sufficient time under the applied conditions and with the given adhesive to effect a firm and secure positioning and adhering of the plastic film upon the bonded glass fiber board.

Following completion of the foregoing operation the resin bonded glass fiber board may be cut into sections of any appropriate dimensions by conventional means not shown.

FIGS. 2 and 3 illustrate other views—top and side views respectively—of the construction of the glass fiber reinforced resin platen required in the practice of this invention constituting the continuous production of faced bonded fiber masses or boards free of visibly perceptive undulations or defects, etc. The glass fiber reinforced resin platen is generally rectangular in shape having one completely flat and uniformly plane surface 24 for moving contact with the assemblage, and on its opposite side reinforcing ribs or braces formed of glass reinforced plastic tubes 25 to rigidize the sheet-like body and to prevent warpage and preserve its plane under all conditions of use including in particular elevated temperatures.

Typical and effective operating conditions comprise continuously transporting an approximately 2 pound density substantially cured phenolic resin bonded glass fiber board composed of about 12% resin and of about 88% glass fiber, one inch thick and in excess of 4 feet wide at a uniformly continuous rate of approximately 10 feet per minute through the complete operation. A thin vinyl film approximately 0.002 inch in thickness and of substantially commensurate width to that of the board is coated with polyvinyl acetate adhesive and superimposed upon the fibrous board whereupon the composite assemblage is continuously moved transversely under and past a glass fiber reinforced epoxy resin platen measuring 6 feet by 12 feet and an oven enclosing the platen member and maintained at a temperature of about 180° F. by means of hot air effecting a lower or platen working surface temperature of about 140° F. The uniformly applied leveling force exerted by the platen upon the surface of the vinyl film covering the bonded glass board is about 0.04 pound per square inch. Following the foregoing application and curing of the adhesive, thus permanently fixing the vinyl facing free of visually discernible imperfections, the board is trimmed and cut into sections measuring 2 feet by 4 feet for use as ceiling panels.

What I claim is:

1. An improved method of applying a facing of pliable membrane in a flat uniform plane to the open discontinuous surface of a substrate body of a compressible and resilient, dimensionally stable, bonded fibrous mass, consisting essentially of: continuously superimposing a pliable facing member together with an interposed adhesive upon the open discontinuous surface of a substrate body of a compressible and resilient, dimensionally stable bonded fibrous mass and thus forming an assemblage comprising the substrate body of said fibrous mass containing the interposed adhesive and superimposed pliable facing membrane; continuously transporting the assemblage into transversely moving contact with a uniformly flat plane surface of a glass fiber reinforced resin leveling platen and with the superimposed pliable facing contiguous to the platen surface; and, applying a leveling force of light pressure in a uniformly flat plane over the area of contact between the platen and transversely moving assemblage and maintaining said contacting leveling force of light pressure until the intermediately imposed adhesive is set.

2. The improved method of claim 1 wherein the adhesive component comprises a thermally activated material and heat is applied during the application of the leveling force of light pressure between the platen and transversely moving assemblage to set the thermally activated adhesive.

3. The improved method of claim 2 wherein the substrate body of a resilient dimensionally stable bonded fibrous mass comprises a low density thermosetting resin bonded glass fiber mat.

4. The improved method of claim 3 wherein the pliable facing member is a thermoplastic film.

5. The improved method of claim 4 wherein the substrate body of a resilient dimensionally stable bonded fibrous mass comprises a low density thermosetting resin bonded glass fiber mat of approximately 1 to 5 pounds per cubic foot density.

6. The improved method of claim 5 wherein the applied leveling force of light pressure in a uniformly flat plane over the area of contact between the platen and transversely moving assemblage is approximately 0.02 to approximately 0.14 pound per square inch and the applied heat is approximately 120° to approximately 500° F.

7. An improved apparatus for applying a facing of pliable membrane in a flat uniform plane to the open discontinuous surface of a substrate body of a resilient dimensionally stable bonded fibrous mass, comprising in combination:

(a) carrier means for continuously transporting a compressible and resilient, dimensionally stable bonded fibrous mass;

(b) means for continuously superimposing a pliable facing membrane together with an interposed adhesive upon the the surface of the bonded fibrous mass transported upon the carrier means;

(c) leveling platen means having a substantially flat plane leveling surface opposing the said carrier means and positioned for applying pressure in a uniformly flat plane over the area of the platen to the surface of the bonded fibrous mass having the pliable facing membrane while the carrier means is continuously transporting the pliable membrane faced bonded fibrous mass in contacting and transverse movement in relation to the leveling platen; and, (d) the said platen means being composed of glass fiber reinforced thermosetting resin.

8. The apparatus of claim 7 wherein the said platen is combined with a heating means to thermally activate the interposed adhesive.

9. The apparatus of claim 8 wherein the glass fiber reinforced thermosetting resin platen is housed within an oven.

10. The apparatus of claim 9 wherein the said platen is constructed of epoxy resin reinforced with glass fiber.

References Cited

UNITED STATES PATENTS 3,008,861  11/1961  Rees et al. _____ 156—302 X
3,318,749  5/1967  Califano et al. _____ 156—229

ROBERT F. STAHL, Primary Examiner

U.S. Cl. X.R.

156—588